Figures 1, 2:
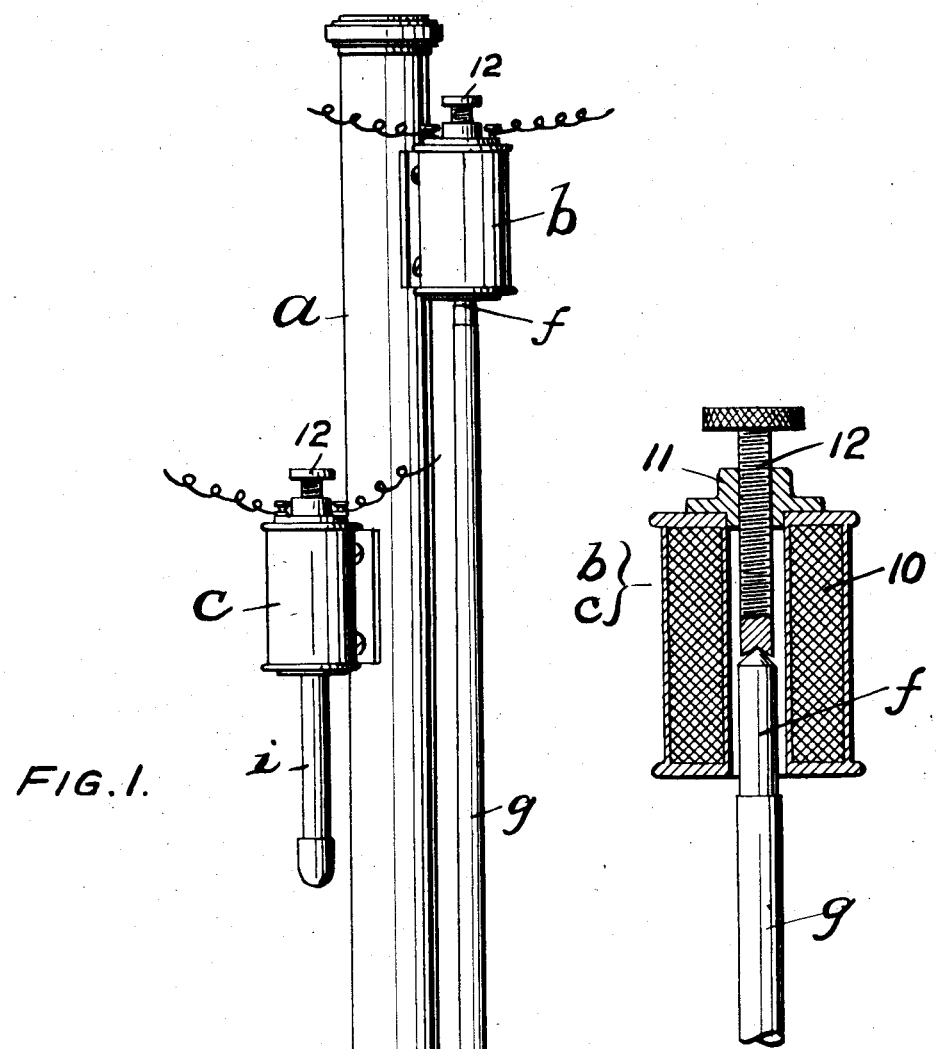

F. I. DU PONT.
PROJECTILE VELOCITY MEASURING CHRONOGRAPH.
APPLICATION FILED JUNE 25, 1918.

1,357,281.

Patented Nov. 2, 1920.
2 SHEETS—SHEET 1.

WITNESS:

INVENTOR
Francis I. du Pont
BY
ATTORNEY.

F. I. DU PONT.
PROJECTILE VELOCITY MEASURING CHRONOGRAPH.
APPLICATION FILED JUNE 25, 1918.
1,357,281. Patented Nov. 2, 1920.
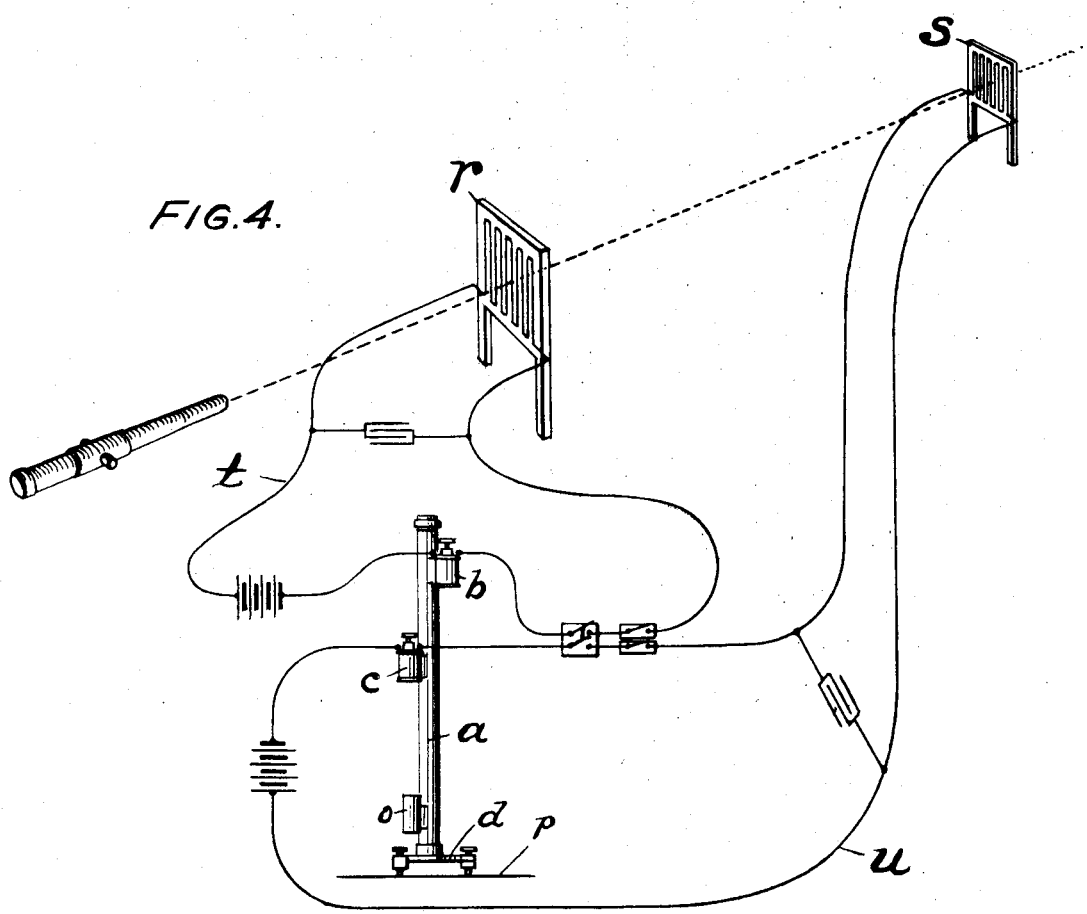
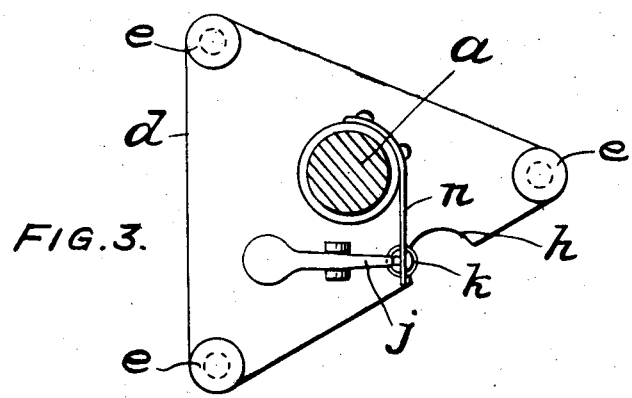
WITNESS:
INVENTOR
Francis I. du Pont
BY
ATTORNEY.

UNITED STATES PATENT OFFICE.

FRANCIS I. du PONT, OF WILMINGTON, DELAWARE, ASSIGNOR TO DELAWARE CHEMICAL ENGINEERING COMPANY, OF WILMINGTON, DELAWARE, A CORPORATION OF DELAWARE.

PROJECTILE-VELOCITY-MEASURING CHRONOGRAPH.

1,357,281.   Specification of Letters Patent.   Patented Nov. 2, 1920.

Application filed June 25, 1918. Serial No. 241,902.

*To all whom it may concern:*

Be it known that I, FRANCIS I. DU PONT, a citizen of the United States, residing at Wilmington, county of New Castle, and State of Delaware, have invented a new and useful Improvement in Projectile-Velocity-Measuring Chronographs, of which the following is a full, clear, and exact description, reference being had to the accompanying drawings, which form a part of this specification.

A standard apparatus for measuring the velocity of a projectile comprises two weights, one a long rod known as a chronometer and enveloped by a tube called the recorder, and the other a short rod called the registrar, electro-magnets upholding the respective rods, and mechanism, actuated by the second rod, in its fall, to mark or indent the recorder during the fall of the first rod. The respective circuits through the two magnets are closed through two targets, the successive perforation of which by the moving projectile opens successively the two circuits and deënergizes successively the two magnets, causing the two rods to fall successively—first the chronometer and then the registrar. The location of the indentation made by the registrar-controlled mechanism enables the velocity of the projectile between the two targets to be calculated.

The instrument described above is known as the Le Boulengé chronograph. Its operation is theoretically perfect, but there is one factor of error which must be carefully ascertained and guarded against, and even when that is done the ascertained velocity is dependably accurate only on the assumption that the factor of error is constant. To the extent that this factor of error may not be constant, the instrument cannot be depended upon to give uniformly dependable results.

The factor of error in the instrument arises from the circumstance that the two rods—the chronograph and the registrar—do not drop instantly upon the opening of the circuits through their respective magnets. This is due to the fact that every electro-magnet which is energized and deenergized by the closing and opening of an electric circuit retains, after the circuit is opened, a certain amount of residual magnetism for a very short but appreciable time. Hence, when the respective circuits through the magnets of the instruments are broken, the rods do not drop instantly, but are held suspended for a very short period of time by the residual magnetism of their respective magnets. This factor of error must be carefully ascertained and allowed for before the instrument is put to its intended use.

It is assumed, in determining this factor of error, that the delay action of both magnets will be the same and that the degree of that delay will be invariable. In fact, however, the assumption is believed not to be absolutely warranted, and consequently it is believed that the operation of the instrument cannot be relied upon to register velocities with invariable accuracy. Moreover, it is obvious that, even if the recognized factor of error above explained were constant and also capable of exact ascertainment, the use of the instrument would be much simplified if this factor of error could be absolutely eliminated.

The object of my invention is to absolutely eliminate this factor of error by substituting for an electro-magnet a solenoid, the core of which is the upper part of the rod, the latter being held within the solenoid coil while the latter is energized, against an alining fixed or adjustable abutment of non-magnetic material. The coil of a solenoid possesses no residual magnetism and it is therefore obvious that instantly upon the opening of the circuit the rod will be released.

In other respects the instrument may be constructed in accordance with known designs. In the accompanying drawings I have illustrated a complete apparatus, all the parts of which are old except as hereinbefore indicated. Figure 1 is a view of the chronograph in elevation. Fig. 2 is a sectional view through one of the solenoids. Fig. 3 is a plan view of the base of the chronograph. Fig. 4 is a diagram showing the chronograph in electrical connection with the targets.

The brass standard *a*, supporting the solenoids *b* and *c* (hereinafter described in detail), is mounted on a triangular bed-plate *d* supported by leveling screws *e*. The long rod *f*, or chronometer, is enveloped by a zinc or copper tube *g*, or recorder. The bed-plate is cut away at *h* to allow the chronometer to drop. The short rod *i*, or registrar, is adapted to drop onto a trigger *j* and release a knife *k*. The trigger *j* is normally held by a spring *m* in position to hold the knife *k* retracted. When the trigger *j* is actuated by the registrar to release the knife *k*, the latter, under the action of the flat steel spring *n*, flies out and indents the recorder, which, with the chronometer, is then falling, having been released previously to the registrar. The tube *o*, through which the registrar falls, supports the registrar after it has actuated the trigger *j*. The stand or table *p*, which supports the instrument, is provided with a pocket which receives the chronometer when it falls, suitable means being provided to arrest the chronometer without shock.

In Fig. 4 are shown two targets, *r* and *s*, each made of continuous wire, and through which the projectile successively passes. The targets are in electric circuits *t* and *u* which include the solenoids *b* and *c* respectively.

Each solenoid comprises a winding 10, a head 11 and an adjustable abutment 12 which comprises a rod screw-threaded through the head and extending part way through the central space inclosed by the winding 10. The top of the chronometer rod *f* (or registrar rod *i*) extends part way through the central space inclosed by the winding 10, and is virtually the core of the solenoid, being upheld so long as current is flowing through the solenoid. The top of the rod (*f* or *i*) is conically beveled to a point, which contacts with a conical recess in the bottom of the abutment 12. The abutment 12 is of non-magnetic material. It is made adjustable so that the rod *f* or *i* may be accurately positioned vertically without a bodily adjustment of the solenoid. However, if the instrument is carefully designed, the abutment 12 may be made fixed and integral with solenoid.

On the passage of the projectile through the first target *r*, the circuit *t* through the solenoid *b* is broken and the chronometer *f* falls instantly. When the projectile passes through the second target *s*, the circuit *u* through the solenoid *c* is broken and the registrar *i* drops instantly. When the latter strikes the trigger *j*, releasing the knife *k*, the latter, propelled by the spring *n*, flies out and marks the recorder *g* at the point which, at that moment during the fall of the chronometer and recorder, is opposite the knife.

There being no residual magnetism in the coil of a solenoid, and the abutment 12 being of non-magnetic material, it is clear that upon breaking the circuit through the solenoid, no delay in the release of the rod upheld thereby is possible. Hence there is no factor of error which must be ascertained and allowed for preparatory to the use of the apparatus.

Having now fully described my invention, what I claim and desire to protect by Letters Patent is:

1. A projectile velocity measuring chronograph comprising elements one of which is adapted to be releasably suspended and when released to drop and coöperate with other elements, a target adapted to be positioned in the path of a projectile, an electric circuit the passage of current through which is controlled by the action of the projectile upon the target, and means controlled by said circuit to sustain said releasable element and release it simultaneously with the action of the projectile upon the target.

2. A projectile velocity measuring chronograph comprising elements one of which is adapted to be releasably suspended and when released to drop and coöperate with other elements, means whereby a projectile in its flight is adapted to open an electric circuit, and a solenoid winding in said circuit adapted when energized to suspend said releasable element and when deënergized to instantly release it.

3. A projectile velocity measuring chronograph comprising elements one of which is adapted to be releasably suspended and when released to drop and coöperate with other elements, and an electric solenoid the core of which is the upper part of said releasable element.

4. A projectile velocity measuring chronograph comprising elements one of which is adapted to be releasably suspended and when released to drop and coöperate with other elements, an electric solenoid winding, an adjustable abutment of non-magnetic material extending into the upper part of the hollow center of the solenoid winding, the upper part of said releasable element forming the core of the solenoid and extending into the lower part of the hollow center of the solenoid winding and held therein in definite vertical position by contact with said abutment.

5. A projectile velocity measuring chronograph comprising a chronometer, a registrar, and two solenoid windings, the upper ends of the chronometer and registrar forming the cores of the respective solenoid windings.

6. A projectile velocity measuring chronograph comprising elements one of which is adapted to be releasably suspended and when released to drop and coöperate with other elements, a target adapted to be positioned in the path of a projectile, an electric circuit the passage of the current through which is controlled by the action of the projectile upon the target, a solenoid winding in said circuit, said releasable element comprising the core of the solenoid and adapted to be suspended by said winding, whereby, due to the absence of residual magnetism in the supporting element, the breaking of the circuit by the action of the projectile upon the target will effect the instantaneous release of the releasable element.

In testimony of which invention I have hereunto set my hand, at Wilmington, Delaware, on this 24th day of June, 1918.

FRANCIS I. du PONT.